(12) United States Patent
Cipriano et al.

(10) Patent No.: US 11,952,639 B1
(45) Date of Patent: Apr. 9, 2024

(54) METHODS FOR TEMPERING OF STEEL FOR RIVETING

(71) Applicant: GM GLOBAL TECHNOLOGY OPERATIONS LLC, Detroit, MI (US)

(72) Inventors: Steven Cipriano, Chesterfield, MI (US); Pei-chung Wang, Forest Hills, NY (US); Zhenke Teng, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/145,938

(22) Filed: Dec. 23, 2022

(51) Int. Cl.

| | | |
|---|---|---|
| *C21D 1/40* | (2006.01) | |
| *B21J 15/02* | (2006.01) | |
| *B21J 15/08* | (2006.01) | |
| *B23K 11/16* | (2006.01) | |
| *C21D 6/00* | (2006.01) | |
| *C21D 11/00* | (2006.01) | |
| *B23K 103/04* | (2006.01) | |

(52) U.S. Cl.
CPC .............. *C21D 11/00* (2013.01); *B21J 15/08* (2013.01); *B23K 11/16* (2013.01); *C21D 1/40* (2013.01); *C21D 6/00* (2013.01); *B21J 15/025* (2013.01); *B23K 2103/04* (2018.08)

(58) Field of Classification Search
CPC ....... B21J 15/025; B21J 15/02; B23K 11/066; B23K 11/11; B23K 11/16; B23K 2103/04; C21D 1/40
See application file for complete search history.

(56) References Cited

U.S. PATENT DOCUMENTS

| | | | |
|---|---|---|---|
| 2016/0355902 A1* | 12/2016 | Yang | B23K 11/115 |
| 2016/0368080 A1* | 12/2016 | Hatta | B23K 11/314 |
| 2019/0061043 A1* | 2/2019 | Kadoya | B23K 11/004 |
| 2021/0069821 A1* | 3/2021 | Wang | B23K 11/20 |
| 2021/0323614 A1* | 10/2021 | Frost | B62D 25/04 |
| 2022/0097165 A1* | 3/2022 | Haselhuhn | B21J 15/025 |

* cited by examiner

*Primary Examiner* — Christopher J Besler
(74) *Attorney, Agent, or Firm* — Lorenz & Kopf, LLP

(57) ABSTRACT

A method for tempering steel for riveting includes positioning a first component having a first composition over a second component having a second composition, and resistance spot welding the first component to the second component using a resistance spot weld gun to form a spot weld. The method includes tempering at least one of the first component, the second component and the spot weld with the resistance spot weld gun, and coupling a third component having a third composition to the first component and the second component with a rivet, and the third composition is different than the first composition and the second composition.

20 Claims, 7 Drawing Sheets

METHODS FOR TEMPERING OF STEEL FOR RIVETING

INTRODUCTION

The technical field generally relates to methods for tempering steel to enable riveting, and more particularly relates to methods for tempering of a weld formed between a steel component and an advanced high strength steel (AHSS) component to enable self-piercing riveting to couple an aluminum component to the steel component and the AHSS component.

During the manufacture of various devices, one or more components may need to be coupled together to form a subassembly. For example, in the manufacture of vehicles, a steel component may need to be coupled to an aluminum component to form a subassembly for the vehicle. As a further example, two or more steel components, such as a steel component and an AHSS component, may be coupled together, via welding, for example, and it may be desirable to couple the aluminum component to the two or more steel components via riveting, for example, to form the subassembly. In certain instances, due to the strength of the steel, it may not be possible to use self-piercing riveting to secure the aluminum component to the two or more steel components as the self-piercing rivet is unable to pass through the two or more steel components.

Accordingly, it is desirable to provide methods for tempering steel to enable riveting, which enables an aluminum component to be coupled to two or more steel components, such as a steel component and an AHSS component, with self-piercing rivets. Furthermore, other desirable features and characteristics of the present invention will become apparent from the subsequent detailed description and the appended claims, taken in conjunction with the accompanying drawings and the foregoing technical field and background.

SUMMARY

According to various embodiments, provided is a method for tempering steel for riveting. The method includes positioning a first component having a first composition over a second component having a second composition, and resistance spot welding the first component to the second component using a resistance spot weld gun to form a spot weld. The method includes tempering at least one of the first component, the second component and the spot weld with the resistance spot weld gun, and coupling a third component having a third composition to the first component and the second component with a rivet, and the third composition is different than the first composition and the second composition.

The first component is composed of a first type of steel and the second component is composed of a second type of steel, the second type of steel having a tensile strength of at least 1000 megapascal (MPa). The first component and the second component are composed of a type of steel, and the third component is composed of aluminum or aluminum alloy. The tempering of the at least one of the first component, the second component and the spot weld with the resistance spot weld gun includes determining, by a processor, a tempering schedule based on the resistance spot welding, and tempering the first component, the second component and the spot weld with the resistance spot weld gun based on the tempering schedule. The determining the tempering schedule based on the resistance spot welding includes setting, by the processor, a force applied by the resistance spot weld gun during the tempering schedule based on the force applied to the first component and the second component during the resistance spot welding, and setting, by the processor, a cool time between the resistance spot welding and the tempering based on a hold time associated with the first component and the second component. The determining the tempering schedule based on the resistance spot welding includes setting, by the processor, a tempering current based on a peak current applied during the resistance spot welding, and setting, by the processor, a tempering time based on the hold time associated with the first component and the second component. The method includes applying the tempering current for the tempering time by the resistance spot weld gun after expiration of the cool time. The coupling of the third component with the rivet is after expiration of the hold time. The method includes determining, by the processor, a microhardness of at least the second component after the tempering, determining, by the processor, that the microhardness of the second component is greater than a microhardness threshold, and adjusting, by the processor, the tempering current of the tempering schedule based on the peak current applied during the resistance spot welding multiplied by an incremented value. The method includes determining, by the processor, a microhardness of at least the second component after the tempering, determining, by the processor, that the microhardness of at least the second component is less than or equal to a microhardness threshold, and outputting a processing schedule to the resistance spot weld gun based on the determining that the microhardness of at least the second component is less than or equal to the microhardness threshold. The processing schedule includes instructions for the resistance spot welding and the tempering schedule.

Further provided is a method for tempering steel for riveting. The method includes positioning a first component composed of a first type of steel over a second component composed of a second type of steel, the second type of steel having a tensile strength of at least 1000 megapascal (MPa), and resistance spot welding the first component to the second component using a resistance spot weld gun to form a spot weld. The method includes after the resistance spot welding, tempering the first component, the second component and the spot weld with the resistance spot weld gun to soften at least the second component, and after the tempering, coupling a third component to the first component and the second component with a rivet.

The third component is composed of aluminum or aluminum alloy. The tempering of the first component, the second component and the spot weld with the resistance spot weld gun includes determining, by a processor, a tempering schedule based on the resistance spot welding, and tempering the first component, the second component and the spot weld with the resistance spot weld gun based on the tempering schedule. The determining the tempering schedule based on the resistance spot welding includes setting, by the processor, a force applied by the resistance spot weld gun during the tempering schedule based on the force applied to the first component and the second component during the resistance spot welding, setting, by the processor, a cool time between the resistance spot welding and the tempering based on a hold time associated with the first component and the second component, setting, by the processor, a tempering current based on a peak current applied during the resistance spot welding, and setting, by the processor, a tempering time based on the hold time associated with the first component and the second component. The method includes applying the tempering current for the tempering time by the resistance spot weld gun after expiration of the cool time. The coupling of the third component with the rivet is after expiration of the hold time. The method includes determining, by the processor, a microhardness of at least the second component after the tempering, determining, by the processor, that the microhardness of at least the second component is less than or equal to a microhardness threshold, and outputting a processing schedule to the resistance spot weld gun based on the determining that the microhardness of at least the second component is less than or equal to the microhardness threshold. The processing schedule includes instructions for the resistance spot welding and the tempering schedule.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding introduction, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein are merely exemplary embodiments of the present disclosure.

For the sake of brevity, conventional techniques related to signal processing, data transmission, signaling, control, machine learning models, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure. As used herein, the term "about" denotes within 10%.

Figure 1:
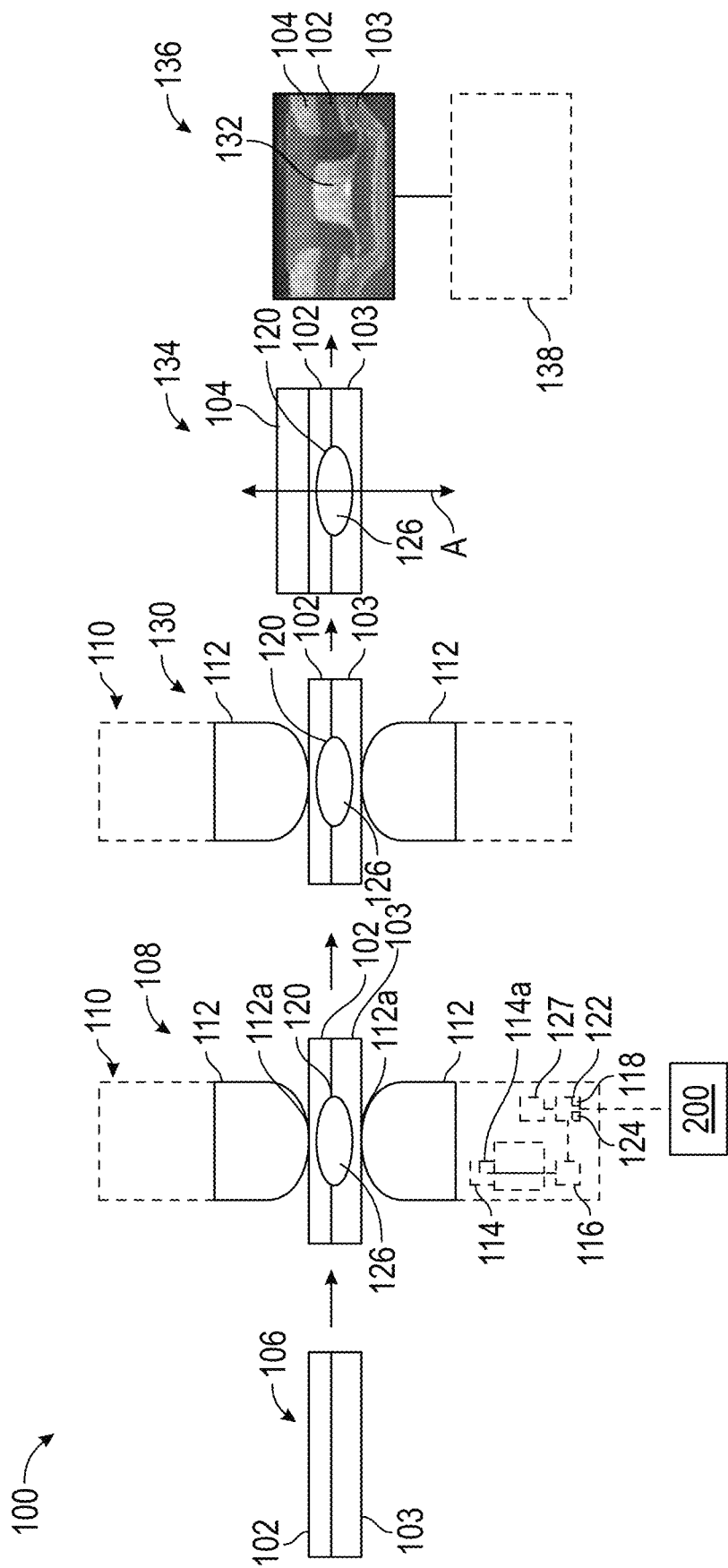
FIG. 1 is a schematic illustration of a manufacturing method that includes tempering steel for self-piercing riveting in accordance with various embodiments.
Figure 2:
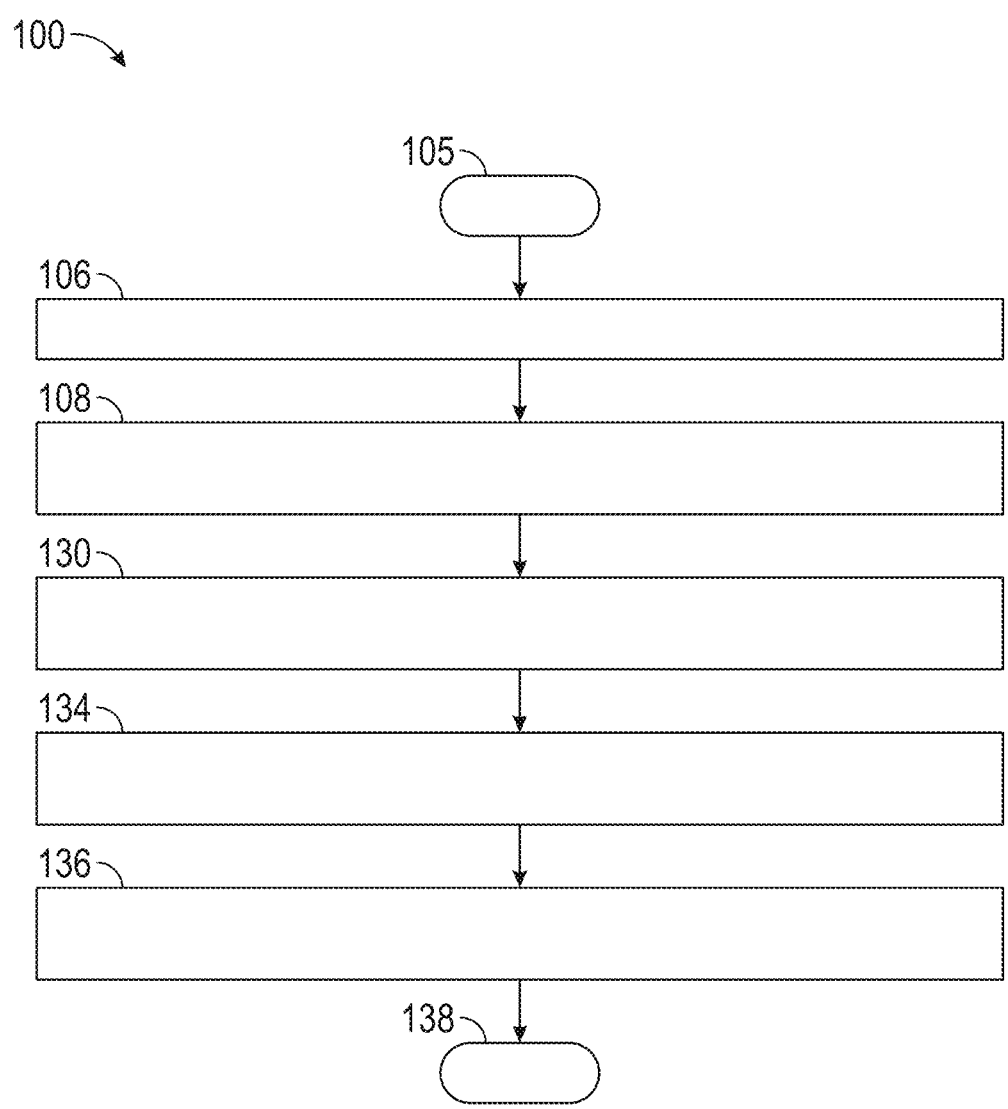
FIG. 2 is a flow chart illustrating the manufacturing method in accordance with various embodiments.

With reference to FIGS. 1 and 2, a manufacturing method for coupling a first component 102 and a second component 103 to a third component 104 using self-piercing rivets 106 is shown generally as 100 in accordance with various embodiments. In this example, the first component 102 is composed of a first type of steel, including, but not limited to a high strength steel. In one example, the first component 102 is composed of dual phase (DP) 980 steel or DP980 steel, which is bare or uncoated. The second component 103 is composed of a second type of steel, including, but not limited to a generation three steel or an advanced high strength steel (AHSS) having a tensile strength of at least 1000 megapascal (MPa) or greater. In one example, the second component 103 is composed of retained austenite (RA) 1180 steel or RA1180 steel, which is bare or uncoated. The third component 104 is composed of a lower strength material with a tensile strength less than 1000 megapascal (MPa). In one example, the third component 104 is composed of aluminum or aluminum alloy. In other examples, the third component 104 may be composed of a non-ferrous metal or metal alloy, including, but not limited to magnesium, etc. As will be discussed, the manufacturing method 100 enables the third component 104 to be coupled to the first component 102 and the second component 103 with a self-piercing rivet 132, which reduces manufacturing complexity and improves manufacturing efficiency.

The manufacturing method 100 begins at 105. In one example, the manufacturing method 100 includes, at 106, positioning the first component 102 and the second component 103 for joining. Each of the first component 102 and the second component 103 are illustrated as a planar sheet, however, one or both of the first component 102 and the second component 103 may comprise other shapes that are positioned together for joining. In this example, the first component 102 is stacked over or on top of the second component 103 such that the first component 102 and the second component 103 overlap. Generally, each of the first component 102 and the second component 103 are of a predetermined chemistry, and have predetermined thermal, mechanical, and mechanical properties that change based on temperature. Each of the first component 102 and the second component 103 also include a predetermined sheet gauge. Each of the first component 102 and the second component 103 may also include a coating, if desired, including, but not limited to a galvanized coating, galvanneal coating, electro-galvanized coating. If the first component 102 and/or the second component 103 include a coating, the coating has a thickness measured from the surface of the respective one of the first component 102 and the second component 103 that includes the coating. In this example, the first component 102 and the second component 103 are bare or devoid of a coating. Generally, the first component 102 and the second component 103, are stacked together in a predetermined order. In this example, the first component 102 is stacked on top of the second component 103. The order ensures a proper weld is formed between the first component 102 and the second component 103.

At 108, a weld gun 110 is used to couple or join the first component 102 and the second component 103 in the region of the overlap. In this example, the weld gun 110 is a resistance spot weld gun. With reference to FIG. 1, the weld gun 110 includes a pair of electrodes 112, a cooling system 114, a power source 116 and a gun controller 118. Each of the electrodes 112 contacts a respective one of the first component 102 and the second component 103. The electrodes 112 are composed of a conductive metal or metal alloy, including, but not limited to copper. Each of the electrodes 112 that contacts the respective one of the first component 102 and the second component 103 has a surface 112a with a shape and a size that corresponds to an area of the electrodes 112 in contact with the respective one of the first component 102 and the second component 103. An area of the surface 112a of the electrodes 112 in contact with the respective one of the first component 102 and the second component 103 is about directly proportional to a size of a heat affected zone 120 and a spot weld 126 defined between the first component 102 and the second component 103 during the resistance spot welding of the first component 102 and the second component 103.

The cooling system 114 of the weld gun 110 supplies a cooling fluid, such as water, to the electrodes 112 to reduce a temperature of the electrodes 112 and to assist in cooling the heat affected zone 120 to form the spot weld 126. Generally, each of the electrodes 112 include cooling conduits, which are fluidly coupled to the cooling system 114 to receive the cooling fluid during operation of the weld gun 110. The cooling system 114 may include a pump 114a, which provides the cooling fluid at a predetermined a flow rate through the electrodes 112. The pump 114a may be in fluid communication with a source of the cooling fluid, such as a water storage tank, water supply hose, etc. The pump 114a is also in communication with the power source 116 and the gun controller 118 over a suitable communication media that facilitates the transfer of data, power, commands, etc.

The power source 116 is any source of power for the weld gun 110, including, but not limited to, one or more batteries, etc. In addition, the power source 116 may be an external power source, such as an electrical outlet in proximity to the weld gun 110, and the power source 116 may include a cord capable of receiving power from the electrical outlet, if desired. The gun controller 118 includes at least one processor 122 and a computer-readable storage device or media 124. The processor 122 may be any custom-made or commercially available processor, a central processing unit (CPU), a graphics processing unit (GPU), an application specific integrated circuit (ASIC) (e.g., a custom ASIC implementing a neural network), a field programmable gate array (FPGA), an auxiliary processor among several processors associated with the gun controller 118, a semiconductor-based microprocessor (in the form of a microchip or chip set), any combination thereof, or generally any device for executing instructions. The computer readable storage device or media 124 may include volatile and nonvolatile storage in read-only memory (ROM), random-access memory (RAM), and keep-alive memory (KAM), for example. KAM is a persistent or non-volatile memory that may be used to store various operating variables while the gun controller 118 is powered down. The computer-readable storage device or media 124 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the gun controller 118 in controlling the weld gun 110. In various embodiments, the gun controller 118 is configured to implement instructions of a processing schedule as discussed in detail below. In various embodiments, the instructions of the processing schedule are provided to the gun controller 118 from a computer system 200. The processing schedule includes instructions for the formation of the resistance spot weld and for tempering of the first component 102, the second component 103 and the spot weld 126 formed between the first component 102 and the second component 103 to enable the self-piercing rivet 132 to couple the third component 104 to the first component 102 and the second component 103.

The weld gun 110 may also include a communication system 127. The communication system 127 enables the gun controller 118 to communicate with the computer system 200 to receive the processing schedule. In one example, the communication system 127 includes, but is not limited to, a short-range communication channel, such as Bluetooth®. In this example, the communication system 127 includes at least a receiver that receives the processing schedule from the computer system 200.

Generally, each of the electrodes 112 is coupled to the respective one of the first component 102 and the second component 103 so as to apply a force and an electrical current to the respective one of the first component 102 and the second component 103. The passage of the electrical current through the first component 102 and the second component 103 generates the heat affected zone 120 and the spot weld 126. In one example, the electrical current is applied in three pulses of about 9.5 kiloamp (kA) to about 9.8 kiloamp (kA). The total duration of the three pulses is less than about 800 seconds. Within the heat affected zone 120, each of the first component 102 and the second component 103 melt due to the continued passage of the electrical current. The melting of the first component 102 and the second component 103 forms a nugget having a circular shape that solidifies into the spot weld 126 under the force applied to the first component 102 and the second component 103 by the weld gun 110 once the electrical current is turned off to fuse the first component 102 and the second component 103 together.

With reference to FIGS. 1 and 2, at 130, with the weld gun 110 coupled to the first component 102 and the second component 103 after the completion of the resistance spot weld, the gun controller 118 performs the tempering of the first component 102, the second component 103 and the spot weld 126 formed between the first component 102 and the second component 103. The tempering of the first component 102, the second component 103 and the spot weld 126 by the weld gun 110 after the first component 102 and the second component 103 have been fused together softens the second component 103 to enable a self-piercing rivet 132 to be positioned through the second component 103 to couple the third component 104 to the first component 102 and the second component 103.

At 134, the third component 104 is positioned onto the first component 102. Generally, the third component 104 is positioned over the first component 102 so as to be aligned with an axis A. The axis A is substantially a centerline of the spot weld 126. Stated another way, the third component 104 is positioned so as to be aligned with and disposed over the tempered spot weld 126.

At 136, with the third component 104 positioned over the tempered spot weld 126 and on the first component 102, a rivet gun 138 is used to drive the self-piercing rivet 132 through the second component 103 to couple the third component 104 to the first component 102 and the second component 103. Thus, by tempering at least the second component 103, the third component 104 can be coupled to the first component 102 and the second component 103 with the self-piercing rivet 132. With the third component 104 coupled to the first component 102 and the second component 103 via the self-piercing rivet 132, the manufacturing method 100 ends at 138.

Figure 3:
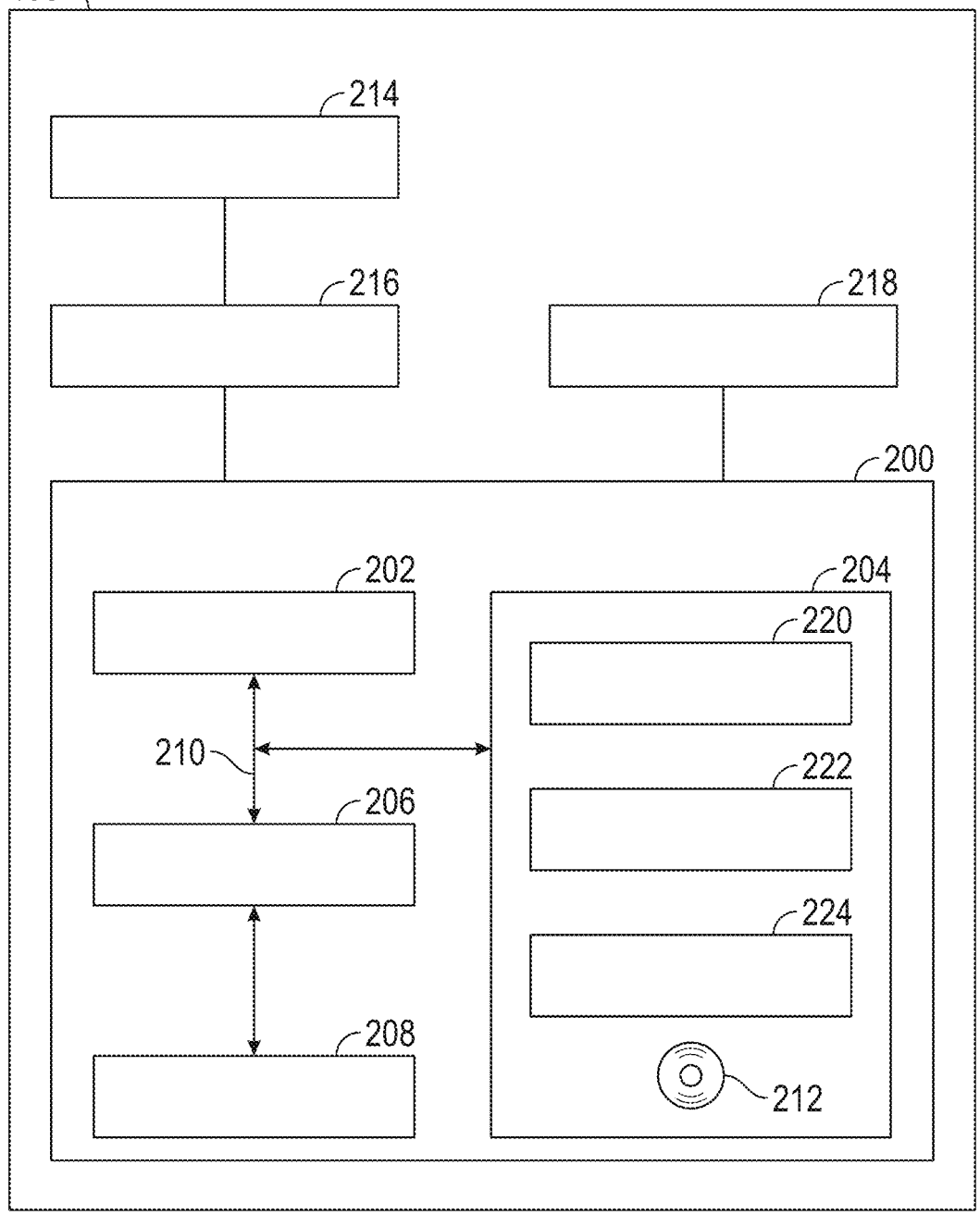
FIG. 3 is a functional block diagram of a system for use in designing a processing schedule for use by a weld gun associated with the manufacturing method of FIG. 1 in accordance with various embodiments.

With reference to FIG. 3, the computer system 200 is shown in greater detail. The computer system 200 provides the processing schedule for the gun controller 118. In various embodiments, the computer system 200 comprises a processor 202, a memory 204, an interface 206, a storage device 208, a bus 210, and a disk 212. A manufacturing system or system 198 includes the computer system 200 and may also include a user input device 214, a display 216, a transceiver 218, and/or one or more other systems and/or components thereof. In addition, it will be appreciated that the computer system 200 may otherwise differ from the embodiment depicted in FIG. 3. For example, the computer system 200 may be coupled to or may otherwise utilize one or more remote computer systems and/or other control systems.

The processor 202 performs the computation and control functions of the computer system 200, and may comprise any type of processor or multiple processors, single integrated circuits such as a microprocessor, or any suitable number of integrated circuit devices and/or circuit boards working in cooperation to accomplish the functions of a processing unit. During operation, the processor 202 executes one or more programs 220 contained within the memory 204 and, as such, controls the general operation of the computer system 200, generally in executing the processes described herein, such as the process 300 discussed further below in connection with FIGS. 4-7. In one example, the one or more programs 220 includes, but is not limited to, SORPAS® welding software commercially available from Swantec Software and Engineering ApS of Denmark. In addition, or alternatively, the one or more programs 220 include Simufact, commercially available from Hexagon AB of Sweden or Sysweld, commercially available from Esi Group of France.

The memory 204 can be any type of suitable memory. For example, the memory 204 may include various types of dynamic random access memory (DRAM) such as SDRAM, the various types of static RAM (SRAM), and the various types of non-volatile memory (PROM, EPROM, and flash). In certain examples, the memory 204 is located on and/or co-located on the same computer chip as the processor 202. In the depicted embodiment, the memory 204 stores the above-referenced program 220 along with a plurality of algorithms 222 and stored values 224 (e.g., including, in various embodiments, tables for implementing the process 300 of FIGS. 4-7 and a threshold value for microhardness).

The interface 206 allows communications to the computer system 200, for example from a system driver and/or another computer system, and can be implemented using any suitable method and apparatus. In one embodiment, the interface 206 obtains the various data from the user input device 214, the display 216, the transceiver 218, and/or one or more other components and/or systems. The interface 206 can include one or more network interfaces to communicate with other systems or components. The interface 206 may also include one or more network interfaces to communicate with the weld gun 110 and/or technicians, and/or one or more storage interfaces to connect to storage apparatuses, such as the storage device 208.

The storage device 208 can be any suitable type of storage apparatus, including various different types of direct access storage and/or other memory devices. In one exemplary embodiment, the storage device 208 comprises a program product from which memory 204 can receive the program 220 that executes one or more embodiments of one or more processes of the present disclosure, such as the steps of the process 300 discussed further below in connection with FIGS. 4-7. In another exemplary embodiment, the program product may be directly stored in and/or otherwise accessed by the memory 204 and/or one or more other disks 212 and/or other memory devices.

The bus 210 can be any suitable physical or logical means of connecting computer systems and components. The bus 210 serves to transmit programs, data, status and other information or signals between the various components of the computer system 200. This includes, but is not limited to, direct hard-wired connections, fiber optics, infrared and wireless bus technologies. During operation, the program 220 is stored in the memory 204 and executed by the processor 202.

In various embodiments, the user input device 214 is configured to be utilized by one or more users involved in the design of the processing schedule. In various embodiments, the user input device 214 enables the user to select different parameters required for the determination of the processing schedule. For example, as described in greater detail further below in connection with the process 300 of FIGS. 4-7, in various embodiments the user input device 214 collects user inputs as to the composition of the first component 102 and the second component 103, the cooling system 114 associated with the weld gun 110, the electrodes 112 associated with the weld gun 110 and any related parameters. Generally, the user input device 214 may comprise any number of different types of input devices and/or combinations thereof. For example, in certain embodiments, the user input device 214 may comprise one or more touch screens, keyboards, computer mice, joysticks, buttons, knobs, dials, microphones, and/or any number of other different types of input devices and/or combinations thereof.

In various embodiments, the display 216 provides a display and/or other graphical interface to the user to aide in the designing of the processing schedule. In certain embodiments, the display 216 provides results of a tempering schedule (e.g., as to potential microhardness and/or other determinations) that are made by the computer system 200 in response to the user inputs. In various embodiments, the display 216 may include one or more display screens and/or other displays that provide a visual display for the user. In certain embodiments, the display 216 may be part of and/or coupled with the user input device 214; however, this may vary in other embodiments.

In certain embodiments, the computer system 200 may also include the transceiver 218. In certain embodiments, the transceiver 218 (and/or a receiver thereof) may receive user inputs and/or other data used for designing the processing schedule. In addition, in certain embodiments, the transceiver 218 (and/or a transmitter thereof) may also be utilized in providing the processing schedule to the weld gun 110.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 202) to perform and execute the program. Such a program product may take a variety of forms, and the present disclosure applies equally regardless of the particular type of computer-readable signal bearing media used to carry out the distribution. Examples of signal bearing media include, but is not limited to: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system 200 may also otherwise differ from the embodiment depicted in FIG. 3, for example in that the computer system 200 may be coupled to or may otherwise utilize one or more remote computer systems and/or other control systems.

Figure 4:
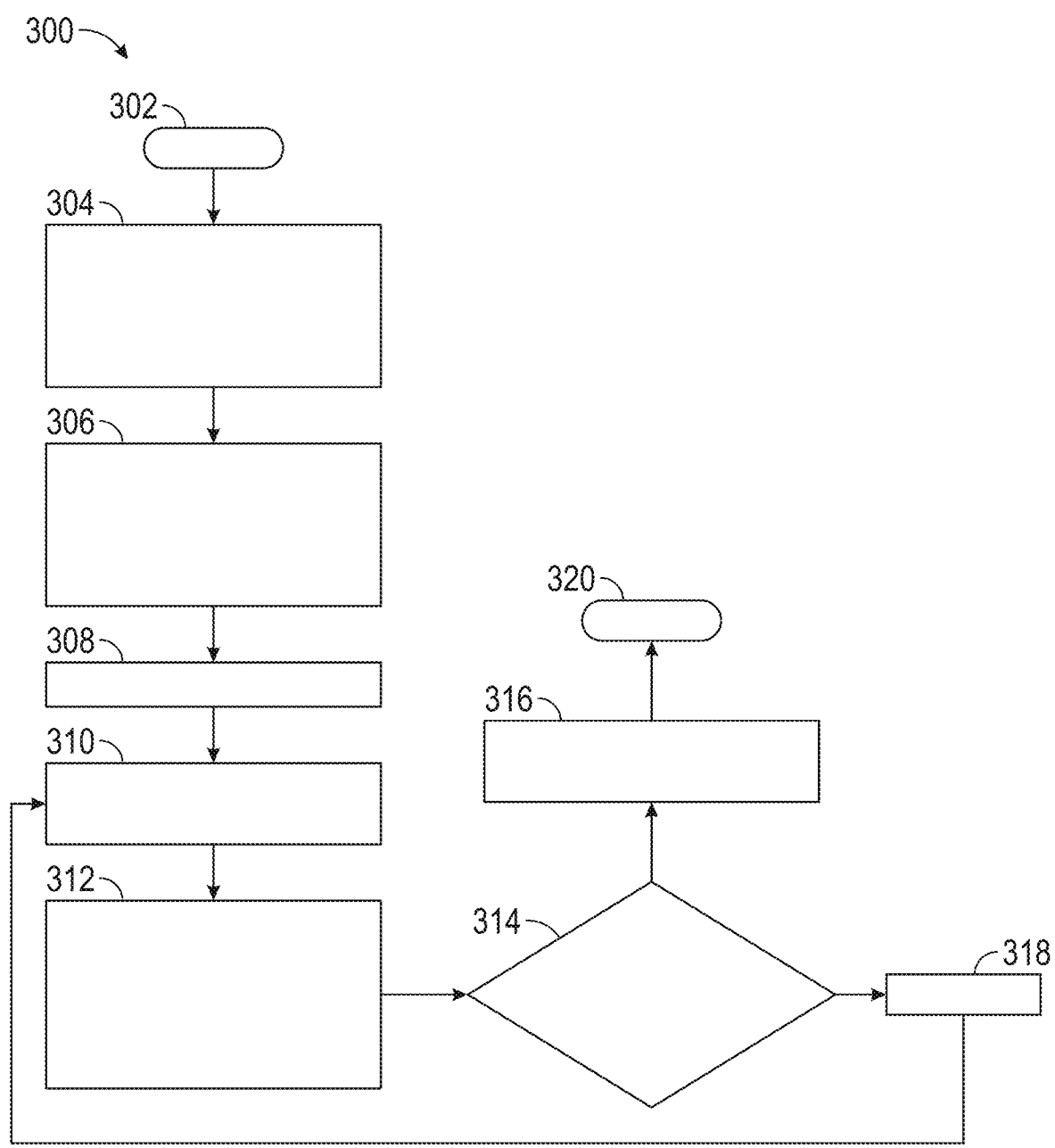
FIG. 4 is a flow chart illustrating a process for designing the processing schedule that can be implemented in connection with the system of FIG. 3, in accordance with various embodiments.

FIG. 4 is a flowchart of a process 300 for designing a processing schedule for resistance spot welding and tempering of steel in accordance with an exemplary embodiment. In various embodiments, the process 300 is utilized for designing a processing schedule that may be used by the weld gun 110 to resistance spot weld and temper the first component 102, the second component 103 and the spot weld 126 to enable the self-piercing rivet 132 (FIG. 1) to be used to couple the third component 104 to the first component 102 and the second component 103. In various embodiments, the process 300 can be implemented in connection with the system 198 of FIG. 3.

In various embodiments, with reference to FIG. 4, the process 300 begins at 302. The process 300 may begin when a user calls for the process 300 to begin operation, for example as the design of the processing schedule is begun. At 304, the process 300 receives input data regarding the first component 102, the second component 103 and the weld gun 110 via the user input device 214, for example. In one example, the process 300 receives the type of material from which the first component 102 and the second component 103 are composed, including the chemistry of the material of each of the first component 102 and the second component 103, the sheet gauge of each of the first component 102 and the second component 103, a coating associated with either of the first component 102 and the second component 103 and a thickness of the coating, if applicable. Generally, the data regarding the chemistry of the material includes, but is not limited to, a carbon concentration by weight percent, a silicon concentration by weight percent, a manganese concentration by weight percent. The sheet gauge may range from about 0.6 millimeters (mm) to about 5 millimeters (mm). The types of coatings include, but are not limited to, galvanized coating, galvanneal coating, electro-galvanized coating, and bare (no coating). The thickness of the coating may range from 0 micrometers (μm) (no coating) to about 50 micrometers (μm). The input data also includes data regarding the material properties associated with the first component 102 and the second component 103, including, but not limited to coefficient of thermal expansion (CTE), thermal conductivity, resistivity versus temperature, yield strength versus temperature, and tensile strength versus temperature. In certain instances, the stored values 224 include data regarding the chemistry of the material and the material properties associated with the material from which the first component 102 and the second component 103 are composed. Thus, in certain embodiments, the input data may include the material from which the first component 102 and the second component 103 are composed and the process 300 retrieves the data regarding the chemistry of the material and the material properties associated with the material from the stored values 224. The input data also includes the order for which the first component 102 and the second component 103 are stacked. In this example, the first component 102 is composed of DP980 steel, which is bare or uncoated with no coating thickness and the second component 103 is composed of RA1180 steel, which is bare or uncoated with no coating thickness. The first component 102 is stacked on top of the second component 103.

The input data also includes data regarding the weld gun 110. In one example, the input data includes a size and a type of the electrodes 112 associated with the weld gun 110. The input data also includes the water cooling flow rate associated with the pump 114a of the cooling system 114 of the weld gun 110. In this example, the electrodes 112 are size 2 copper electrodes, and the water cooling flow rate is about 8 liters per minute. Generally, the water cooling flow rate ranges from about 6 liters per minute to about 12 liters per minute.

At 306, the process 300 includes performing a simulation of resistance spot welding the first component 102 to the second component 103 based on the data associated with the first component 102 and the second component 103 along with the data regarding the weld gun 110. At 308, the process 300 includes setting a constant N equal to zero. At 310, the process 300 includes applying an in-process tempering schedule.

Figure 5:
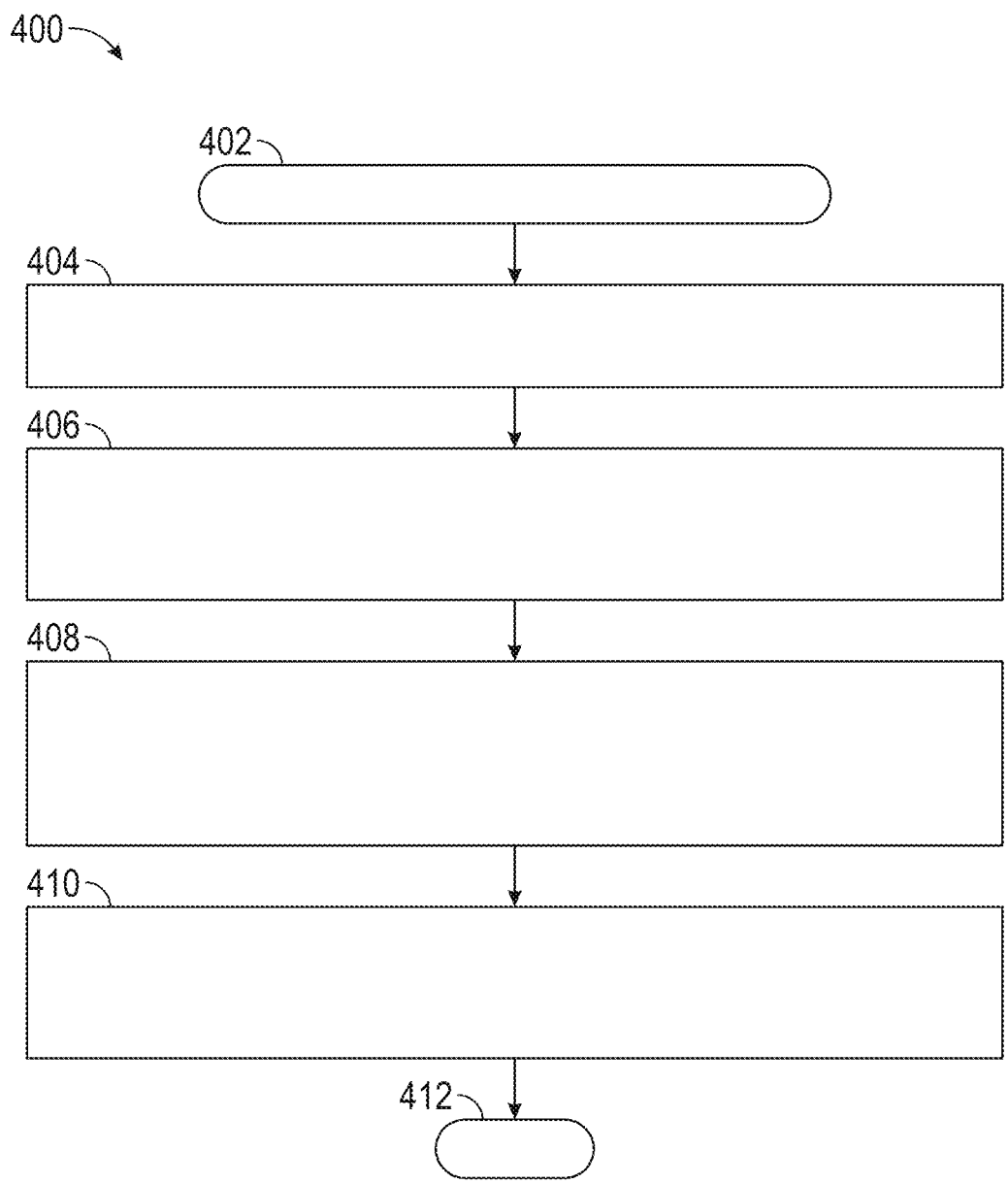
FIG. 5 is a flow chart illustrating an in-process tempering schedule that can be implemented in connection with the system of FIG. 3, in accordance with various embodiments.

With reference to FIG. 5, FIG. 5 is a flowchart of a process 400 for applying an in-process tempering schedule for the tempering of steel in accordance with an exemplary embodiment. The in-process tempering schedule begins at 402. At 404, the process 400 sets a force equal to the force applied during resistance spot welding. The force is the force applied to the first component 102 and the second component 103 by the electrodes 112 of the weld gun 110 during the resistance spot welding. In this example, the force is about 2 kilonewton (kN) to about 7 kilonewton (kN), and may be retrieved from a look-up table associated with the stored values 224 based on the order of the first component 102 and the second component 103. Stated another way, the process 400 sets the force applied by the weld gun 110 during the tempering schedule based on the force applied to the first component 102 and the second component 103 during the resistance spot welding. At 406, the process 400 sets a cool time equal to a first predetermined constant multiplied by a hold time for the first component 102 and the second component 103, or:

$$CT = N_1 * HT \tag{1}$$

Wherein CT is the cool time between the resistance spot welding and the start of the tempering in milliseconds (ms);

$N_1$ is the first predetermined constant; and HT is the hold time for the first component 102 and the second component 103 in milliseconds (ms), which is retrieved from a look-up table associated with the stored values 224. In one example, the hold time HT is about 100 milliseconds (ms) to about 500 milliseconds (ms). The first predetermined constant $N_1$ is predetermined to achieve the microhardness of the second component 103 as less than 200 Vickers hardness number (VHN). In the example of the first component 102 composed of DP980 steel and the second component 103 composed of RA1180 steel, the first predetermined constant $N_1$ is about 4.5 to about 5. Stated another way, the process 400 sets a cool time between the resistance spot welding and the tempering based on the hold time HT associated with the first component 102 and the second component 103.

At 408, the process 400 sets a tempering current. In one example, the tempering current is as follows:

$$I_t = (N_2 + N*N_3)*I_p \quad (2)$$

Wherein $I_t$ is the tempering current in kiloamps (kA); Na is a second predetermined constant; $N_3$ is a third predetermined constant; N is the counter set at 308 of process 300; and $I_p$ is the peak current in kiloamps (kA) used in the resistance spot welding. The second predetermined constant $N_2$ is a starting tempering current represented as a percentage of the peak welding current, and in the example of the first component 102 composed of DP980 steel and the second component 103 composed of RA1180 steel, the second predetermined constant $N_2$ is about 0.7 or 70%. The third predetermined constant $N_3$ is a percentage of the tempering current that is increased each time, and in the example of the first component 102 composed of DP980 steel and the second component 103 composed of RA1180 steel, the third predetermined constant $N_3$ is about 0.1 or 10%. In the example of the first component 102 composed of DP980 steel and the second component 103 composed of RA1180 steel, the peak current $I_p$ used in resistance spot welding is about 6 kiloamp (kA) to about 15 kiloamp (kA) and may be retrieved from a look-up table associated with the stored values 224 based on the input data. Stated another way, the process 400 sets the tempering current $I_t$ based on the peak current $I_p$ applied during the resistance spot welding.

At 410, the process 300 sets a tempering time. In one example, the tempering time is as follows:

$$TT = N_4 * HT \quad (3)$$

Wherein TT is the tempering time for the tempering in milliseconds (ms); $N_4$ is a fourth predetermined constant; and HT is the hold time for the first component 102 and the second component 103 in milliseconds (ms). Stated another way, the process 400 sets the tempering time TT based on the hold time HT associated with the first component 102 and the second component 103. The fourth predetermined constant $N_4$ is predetermined to achieve the microhardness of the second component 103 as less than 200 Vickers hardness number (VHN). In the example of the first component 102 composed of DP980 steel and the second component 103 composed of RA1180 steel, the fourth predetermined constant $N_4$ is about 4.5 to about 5. The process 400 ends at 412.

Figure 6:
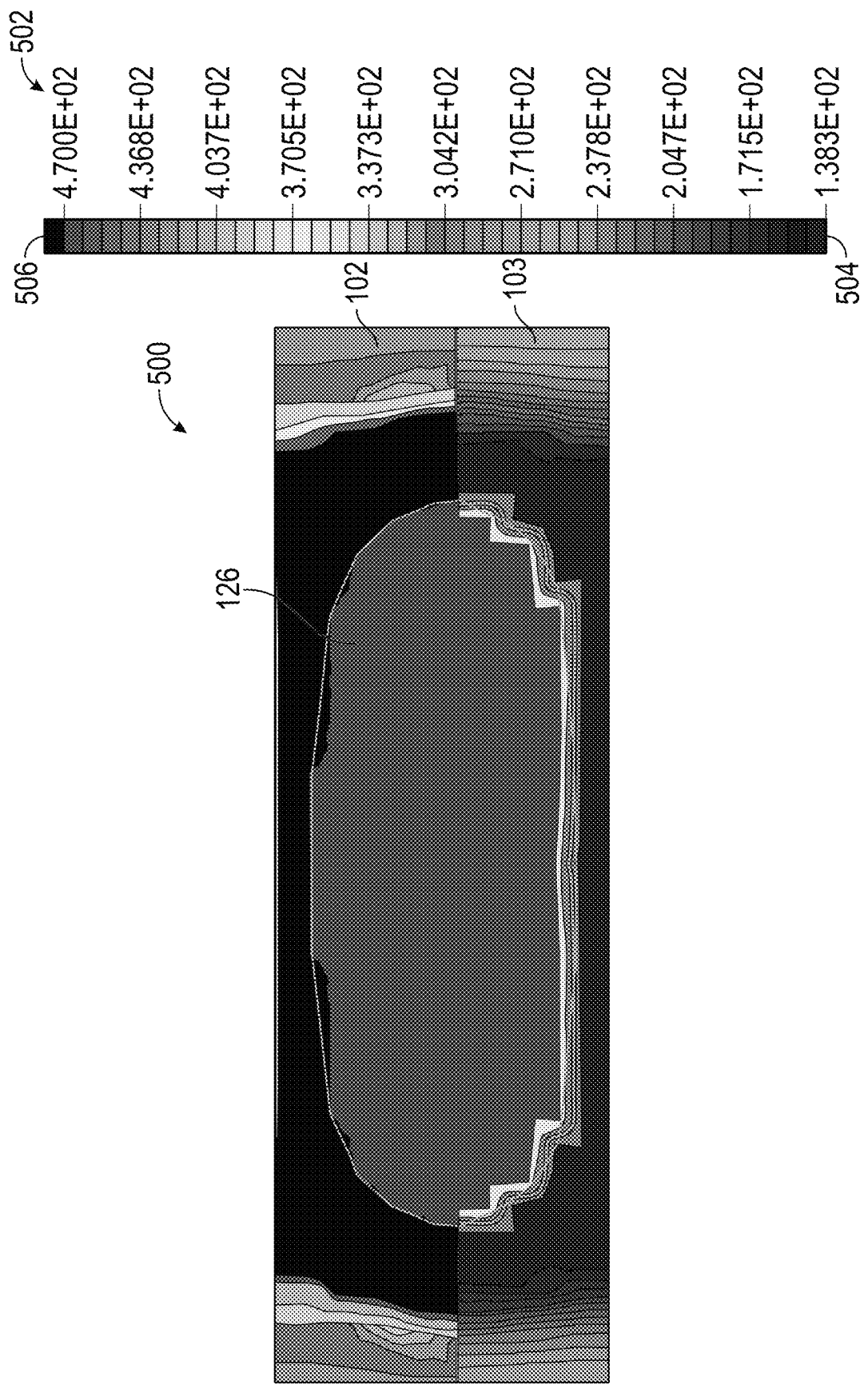
FIG. 6 is an exemplary microhardness map that can be output by the system of FIG. 3 in accordance with various embodiments.

With reference back to FIG. 4, at 312, the process 300 determines the microhardness of the spot weld 126 that has been tempered with the in-process tempering schedule. With reference to FIG. 6, an exemplary map 500 illustrates the microhardness of the spot weld 126, the first component 102 and the second component 103 after the in-process tempering of the spot weld 126 between the first component 102 and the second component 103. The map 500 may be output for display on the display 216. A key 502 provides a scale for the microhardness of the spot weld 126, the first component 102 and the second component 103 in Vickers hardness number (VHN) from a minimum Vickers hardness number 504 to a maximum Vickers hardness number 506. In this example, the second component 103 has a microhardness of about 138.3 Vickers hardness number (VEIN). With reference back to FIG. 4, at 314, the process 300 determines whether the microhardness of the second component 103 is less than or equal to a predetermined microhardness threshold. In one example, the microhardness threshold is about 200 Vickers hardness number (VHN). When the microhardness of the second component 103 is less than or equal to the microhardness threshold, the AHSS steel of the second component 103 is soft and ductile to receive the self-piercing rivet 132, which enables the self-piercing rivet 132 to pass through the AHSS steel of the second component 103 and couple the third component 104 to the first component 102 and the second component 103 without damaging the self-piercing rivet 132, the first component 102 or the second component 103. In this example, as the microhardness of the second component 103 is about 138.3, the microhardness of the second component 103 is less than the microhardness threshold and the process proceeds to 316. Otherwise, if the microhardness of the second component is greater than the microhardness threshold, at 318, the process 300 sets the constant N equal to N plus one, and proceeds to 310.

At 316, the process 300 outputs the processing schedule to the weld gun 110. The processing schedule includes the instructions for the resistance spot welding and the tempering schedule for execution by the processor 122 of the gun controller 118. In one example, the processing schedule is output to the processor 122 of the gun controller 118 via the transceiver 218, and is received by the processor 122 of the gun controller 118 via the communication system 127. It should be noted that prior to outputting the processing schedule designed by the process 300 to the weld gun 110, a test may be performed using exemplary components to ensure that the tempering schedule enables the self-piercing rivet 132 to couple the third component 104 to the first component 102 and the second component 103, if desired.

Figure 7:
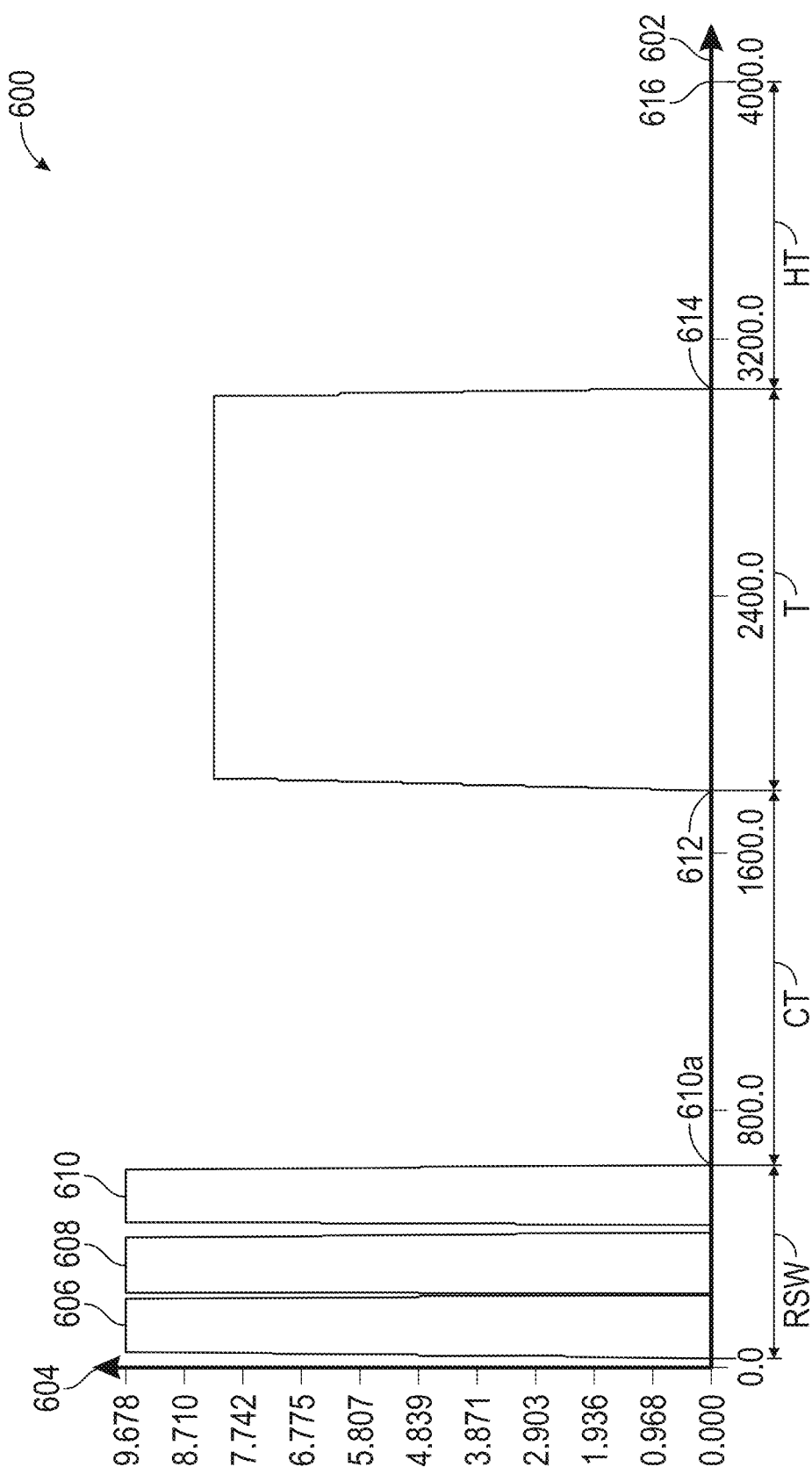
FIG. 7 is an exemplary processing schedule for use by the weld gun associated with the manufacturing method in accordance with various embodiments.

With reference to FIG. 7, and exemplary processing schedule 600 is illustrated. In FIG. 7, the processing schedule 600 is illustrated as a graph of time versus current. In FIG. 7, the abscissa or x-axis 602 is the process time in milliseconds (ms) and the ordinate or y-axis 604 is the current in kiloamps (kA). Proximate the origin of the processing schedule 600, the weld gun 110 is coupled to the first component 102 and the second component 103, and the resistance spot weld (RSW) is formed by pulses 606, 608, 610. Generally, for each pulse 606, 608, 610, the peak current $I_p$ is applied by the electrodes 112 for a short period of time (for example, less than about 260 milliseconds (ms)) in three intervals or the pulses 606, 608, 610 to form the spot weld 126 (FIG. 1) between the first component 102 and the second component 103. After the pulse 610, the weld gun 110 remains coupled to the first component 102 and the second component 103 for the cool time CT and applies the force for the duration of the cool time CT. The cool time CT extends from an end 610a of the pulse 610 (where the current is zero kiloamps (kA)) to a point 612. From point 612 to point 614, the weld gun 110 applies the temper current $I_t$ and temper time TT to temper (T) the spot weld 126, the first component 102 and the second component 103. In this example, the temper current $I_t$ is about 8.225 kiloamps (kA) and the temper time TT is about 1200 milliseconds (ms). From the point 614 to a point 616, the weld gun 110 remains coupled to the first component 102 and the second component 103 for the hold time HT and applies the force for the duration of the hold time HT. In this example, the hold time HT is about 1000 milliseconds (ms). After point 616 or at the end of the hold time HT, the weld gun 110 may be uncoupled from the first component 102 and the second component 103, and the rivet gun 138 may be used to insert the self-piercing rivet 132 through the spot weld 126.

Thus, by providing the processing schedule from the process 300 to the gun controller 118, the operator may use the weld gun 110 to form the resistance spot weld 126 between the first component 102 and the second component 103 and to temper the first component 102 and the second component 103 at the spot weld 126 to enable the self-piercing rivet 132 to couple the third component 104 to the first component 102 and the second component 103. Stated another way, the processing schedule provided by the process 300 enables the aluminum component or the third component 104 to be coupled to two or more steel components or the first component 102 and the second component 103 with the self-piercing rivet 132. This reduces manufacturing complexity by enabling the use of rivets to couple the third component 104 to the first component 102 and the second component 103. Generally, the tempering of the first component 102, the second component 103 and the spot weld 126 softens at least the second component 103 so that the self-piercing rivet 132 can pierce through the first component 102, the second component 103 and the spot weld 126 to couple the third component 104 to the first component 102 and the second component 103. In addition, by providing the gun controller 118 with the processing schedule that includes both the resistance spot weld and the tempering, the operator may perform the resistance spot weld and the tempering in a single operation or single use of the weld gun 110, which improves efficiency.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of riveting, comprising:
   positioning a first component having a first composition over a second component having a second composition, the first composition different than the second composition;
   resistance spot welding the first component to the second component using a resistance spot weld gun to form a spot weld;
   after the resistance spot welding, tempering at least one of the first component, the second component and the spot weld with the resistance spot weld gun to soften at least the second component; and
   after the tempering, coupling a third component having a third composition to the first component and the second component with a rivet inserted through the spot weld, and the third composition is different than the first composition and the second composition.

2. The method of claim 1, wherein the first component is composed of a first type of steel and the second component is composed of a second type of steel, the second type of steel having a tensile strength of at least 1000 megapascal (MPa).

3. The method of claim 1, wherein the first component and the second component are composed of a type of steel, and the third component is composed of aluminum or aluminum alloy.

4. The method of claim 1, wherein the tempering of the at least one of the first component, the second component and the spot weld with the resistance spot weld gun further comprises:
   determining, by a processor, a tempering schedule based on the resistance spot welding; and
   tempering the first component, the second component and the spot weld with the resistance spot weld gun based on the tempering schedule.

5. The method of claim 4, wherein the determining the tempering schedule based on the resistance spot welding further comprises:
   setting, by the processor, a force applied by the resistance spot weld gun during the tempering schedule based on a first force applied to the first component and the second component during the resistance spot welding; and
   setting, by the processor, a cool time between the resistance spot welding and the tempering based on a hold time associated with the first component and the second component.

6. The method of claim 5, wherein the determining the tempering schedule based on the resistance spot welding further comprises:
   setting, by the processor, a tempering current based on a peak current applied during the resistance spot welding; and
   setting, by the processor, a tempering time based on the hold time associated with the first component and the second component.

7. The method of claim 6, further comprising applying the tempering current for the tempering time by the resistance spot weld gun after expiration of the cool time.

8. The method of claim 6, wherein the coupling of the third component with the rivet is after expiration of the hold time.

9. The method of claim 6, further comprising:
   determining, by the processor, a microhardness of at least the second component after the tempering;
   determining, by the processor, that the microhardness of the second component is greater than a microhardness threshold; and
   adjusting, by the processor, the tempering current of the tempering schedule based on the peak current applied during the resistance spot welding multiplied by an incremented value.

10. The method of claim 4, further comprising:
    determining, by the processor, a microhardness of at least the second component after the tempering;
    determining, by the processor, that the microhardness of at least the second component is less than or equal to a microhardness threshold such that the rivet is insertable through the second component; and
    outputting a processing schedule to the resistance spot weld gun based on the determining that the microhardness of at least the second component is less than or equal to the microhardness threshold.

11. The method of claim 10, wherein the processing schedule includes instructions for the resistance spot welding and the tempering schedule.

12. A method of riveting, comprising:
positioning a first component having a first composition over a second component having a second composition, the first composition different than the second composition;
resistance spot welding the first component to the second component using a resistance spot weld gun to form a spot weld;
after the resistance spot welding, tempering the first component, the second component and the spot weld with the resistance spot weld gun to soften at least the second component; and
after the tempering, coupling a third component having a third composition to the first component and the second component with a rivet inserted through the spot weld, and the third composition is different than the first composition and the second composition.

13. The method of claim 12, wherein the first component is composed of a first type of steel, the second component is composed of a second type of steel, the second type of steel having a tensile strength of at least 1000 megapascal (MPa), and the third component is composed of aluminum or aluminum alloy.

14. The method of claim 12, wherein the tempering of the first component, the second component and the spot weld with the resistance spot weld gun further comprises:
determining, by a processor, a tempering schedule based on the resistance spot welding; and
tempering the first component, the second component and the spot weld with the resistance spot weld gun based on the tempering schedule.

15. The method of claim 14, wherein the determining the tempering schedule based on the resistance spot welding further comprises:
setting, by the processor, a force applied by the resistance spot weld gun during the tempering schedule based on a first force applied to the first component and the second component during the resistance spot welding; and setting, by the processor, a cool time between the resistance spot welding and the tempering based on a hold time associated with the first component and the second component.

16. The method of claim 15, wherein the determining the tempering schedule based on the resistance spot welding further comprises:
setting, by the processor, a tempering current based on a peak current applied during the resistance spot welding; and
setting, by the processor, a tempering time based on the hold time associated with the first component and the second component.

17. The method of claim 16, further comprising applying the tempering current for the tempering time by the resistance spot weld gun after expiration of the cool time.

18. The method of claim 16, wherein the coupling of the third component with the rivet is after expiration of the hold time.

19. The method of claim 16, further comprising:
determining, by the processor, a microhardness of at least the second component after the tempering;
determining, by the processor, that the microhardness of the second component is greater than a microhardness threshold; and
adjusting, by the processor, the tempering current of the tempering schedule based on the peak current applied during the resistance spot welding multiplied by an incremented value.

20. The method of claim 14, further comprising:
determining, by the processor, a microhardness of at least the second component after the tempering;
determining, by the processor, that the microhardness of at least the second component is less than or equal to a microhardness threshold such that the rivet is insertable through the second component; and
outputting a processing schedule to the resistance spot weld gun based on the determining that the microhardness of at least the second component is less than or equal to the microhardness threshold.

* * * * *